United States Patent
Marukawa et al.

(10) Patent No.: US 10,274,309 B2
(45) Date of Patent: Apr. 30, 2019

(54) SENSOR HEAD

(71) Applicant: OMRON Corporation, Kyoto (JP)

(72) Inventors: Mariko Marukawa, Fukuchiyama (JP); Takahiro Okuda, Kyoto (JP); Kosuke Sugiyama, Nantan (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/132,488

(22) Filed: Sep. 17, 2018

(65) Prior Publication Data

US 2019/0101378 A1    Apr. 4, 2019

(30) Foreign Application Priority Data

Oct. 2, 2017    (JP) ................. 2017-193100

(51) Int. Cl.
  *G01B 11/14*    (2006.01)
  *G01C 3/02*    (2006.01)
  *G01J 3/02*    (2006.01)
  *G01J 3/10*    (2006.01)

(52) U.S. Cl.
  CPC .............. *G01B 11/14* (2013.01); *G01C 3/02* (2013.01); *G01B 2210/50* (2013.01); *G01J 3/0208* (2013.01); *G01J 3/0218* (2013.01); *G01J 3/10* (2013.01)

(58) Field of Classification Search
  CPC ..... G01B 11/026; G01B 11/002; G01B 11/14; G01S 5/163; G01S 5/16
  USPC ....................................................... 356/614
  See application file for complete search history.

(56) References Cited

U.S. PATENT DOCUMENTS

| | | | | |
|---|---|---|---|---|
| 5,384,606 A | * | 1/1995 | Koch ................... | A61F 2/1613 351/158 |
| 2008/0019011 A1 | * | 1/2008 | Krneta ................... | G02B 7/023 359/641 |
| 2010/0202054 A1 | * | 8/2010 | Niederer ................. | G02B 3/14 359/558 |
| 2013/0033976 A1 | * | 2/2013 | Garlick ................... | G03H 1/22 369/103 |

FOREIGN PATENT DOCUMENTS

| | | |
|---|---|---|
| EP | 1975554 | 10/2008 |
| JP | 2012208102 | 10/2012 |
| JP | 2015143652 | 8/2015 |

OTHER PUBLICATIONS

"Search Report of Europe Counterpart Application", dated Dec. 4, 2018, p. 1-p. 7.

* cited by examiner

Primary Examiner — Md M Rahman
(74) Attorney, Agent, or Firm — JCIPRNET

(57) ABSTRACT

Provided is a sensor head that can be miniaturized without compromising the measurement accuracy. A case of the sensor head includes a first case part and a second case part respectively having a substantially cylindrical shape with an axis, i.e., optical axis, as a central axis and being opened at an end part, and a connection member having a substantially annular shape with the axis as a central axis. The first case part and the second case part are connected to each other by screwing female thread parts and respectively formed on the inner circumferential surfaces thereof to a male thread part of the connection member.

8 Claims, 6 Drawing Sheets

SENSOR HEAD

CROSS-REFERENCE TO RELATED APPLICATION

This application claims the priority benefit of Japanese application serial no. 2017-193100, filed on Oct. 2, 2017. The entirety of the above-mentioned patent application is hereby incorporated by reference herein and made a part of this specification.

BACKGROUND

Technical Field

The disclosure relates to a sensor head.

Description of Related Art

It is common to use a confocal measuring device that utilizes a confocal optical system as a device for measuring the position of a measurement object without touching the measurement object.

For example, the confocal measuring device described in Patent Document 1 (Japanese Laid-Open No. 2012-208102) uses a confocal optical system in which a diffractive lens is arranged between the light source and the measurement object. The light emitted toward the measurement object is focused at a distance corresponding to the wavelength thereof. The measuring device can measure the position of the measurement object based on the peak of the wavelength of the light reflected by the measurement object.

In such a measuring device, a device called "sensor head", etc. is arranged toward the measurement object to emit light from the sensor head toward the measurement object. The sensor head has a case in which a space serving as an optical path is formed, and the parts that constitute the confocal optical system are housed in the space. Since there are many parts, the assembly of the sensor head requires a lot of work.

Patent Document 2 (Japanese Laid-Open No. 2015-143652) discloses a sensor head that is provided with a case composed of multiple case parts. The case parts are connected to each other to form a space serving as an optical path therein. When the case is disassembled, the inside of each case part can be exposed to facilitate arrangement of the parts. Therefore, it is possible to reduce the work of the assembly.

In the sensor head described in Patent Document 2, when viewed in the direction along the optical axis (hereinafter, viewing in this direction is referred to as "optical axis direction view"), the lens is in a substantially circular shape, whereas each case part is in a substantially square shape. The four corners of the case part are used as the space for forming screw holes. In addition, the case parts are fixed to each other by screws that penetrate the case parts in the thickness direction.

Regarding the sensor head described in Patent Document 2, since the four corners of the case part protrude largely outward from the lens in the optical axis direction view, the size of the sensor head may be increased. It is considered to use a small lens as measures for suppressing increase of the size of the sensor head. However, if the effective diameter of the lens is reduced due to miniaturization of the lens, the measurement accuracy may drop.

Also, in the configuration that the case parts are fixed to each other by screws penetrating each case part in the thickness direction, the wall thickness of the case part has to be sufficiently large in order to ensure the rigidity of the periphery of the screw holes. The increase in the wall thickness of the case part may also lead to an increase in the size of the sensor head.

SUMMARY

Therefore, the disclosure provides a sensor head that can be miniaturized without compromising the measurement accuracy.

The sensor head according to an embodiment of the disclosure is a sensor head of a sensor for measuring a position of a measurement object. The sensor head includes: a diffractive lens emitting light incident from a light source side to a measurement object side along an optical axis and generating chromatic aberration on the light; an objective lens disposed on the measurement object side with respect to the diffractive lens and gathering light incident from a diffractive lens side to emit the light to the measurement object side and emitting the light incident from the measurement object side to the diffractive lens side along the optical axis; and a case having a space formed inside, which houses at least the diffractive lens and the objective lens. The case includes a first case part and a second case part that respectively have a substantially cylindrical shape with the optical axis as a central axis and are opened at an end part, and a connection member that has a substantially annular shape with the optical axis as a central axis. The diffractive lens is disposed inside the first case part. The objective lens is disposed inside the second case part. A male thread part is formed on an outer circumferential surface of the connection member. The first case part and the second case part are connected to each other by screwing female thread parts respectively formed on inner circumferential surfaces of the first case part and the second case part to the male thread part of the connection member.

DESCRIPTION OF THE EMBODIMENTS

The sensor head according to an embodiment of the disclosure is a sensor head of a sensor for measuring a position of a measurement object. The sensor head includes: a diffractive lens emitting light incident from a light source side to a measurement object side along an optical axis and generating chromatic aberration on the light; an objective lens disposed on the measurement object side with respect to the diffractive lens and gathering light incident from a diffractive lens side to emit the light to the measurement object side and emitting the light incident from the measurement object side to the diffractive lens side along the optical axis; and a case having a space formed inside, which houses at least the diffractive lens and the objective lens. The case includes a first case part and a second case part that respectively have a substantially cylindrical shape with the optical axis as a central axis and are opened at an end part, and a connection member that has a substantially annular shape with the optical axis as a central axis. The diffractive lens is disposed inside the first case part. The objective lens is disposed inside the second case part. A male thread part is formed on an outer circumferential surface of the connection member. The first case part and the second case part are connected to each other by screwing female thread parts respectively formed on inner circumferential surfaces of the first case part and the second case part to the male thread part of the connection member.

According to the embodiment, the case includes the first case part and the second case part. The first case part and the second case part respectively have a substantially cylindrical shape with the optical axis as the central axis, and the female thread parts are formed on the inner circumferential surfaces of the first case part and the second case part. The first case part and the second case part are connected to each other via the connection member by screwing the female thread part to the male thread part of the connection member. By connecting the first case part and the second case part having a substantially cylindrical shape in this manner, it is possible to suppress the first case part or the second case part from protruding largely outward from the objective lens, etc. in the optical axis direction view. As a result, the case can be miniaturized without compromising the measurement accuracy.

In the above-described embodiment, the connection member may be disposed between the diffractive lens and the objective lens.

When the first case part and the second case part are connected via the connection member, variations in the dimensions of the case in the direction along the optical axis may become noticeable. Such variations may hinder the light inside the case from traveling properly and reduce the measurement accuracy.

In contrast thereto, in the above configuration, the connection member is disposed between the diffractive lens and the objective lens. In this position, the light travels along the optical axis. Therefore, according to the above configuration, it is possible to reduce the influence of the variations in the dimensions of the case and prevent the measurement accuracy from dropping as compared with the case where the connection member is disposed at a position that the light travels to incline with respect to the optical axis.

In the above-described embodiment, the case may include a presser member that is disposed between the connection member and the diffractive lens as a separate member from the connection member, and the presser member may have a substantially annular shape with the optical axis as a central axis, and a male thread part may be formed on an outer circumferential surface of the presser member, and the presser member may press and fix the diffractive lens to the light source side by screwing the male thread part to the female thread part of the first case part.

The female thread of the first case part is screwed to the male screw of the connection member and the female thread of the second case part is screwed to the male thread of the connection member. When the first case part and the second case part come into contact with each other by the screwing, an external force in the direction along the optical axis may act on the connection member. If the connection member also has the function of pressing and fixing the diffractive lens, the fixing of the diffractive lens may become unstable due to such external force.

In contrast thereto, in the above configuration, the presser member for pressing and fixing the diffractive lens to the light source side is arranged between the connection member and the diffractive lens as a separate member from the connection member. Therefore, even if an external force in the direction along the optical axis acts on the connection member, the external force does not affect the presser member. As a result, the first case part and the second case part can be connected via the connection member while the diffractive lens is stably fixed.

In the above-described embodiment, in the direction along the optical axis, a dimension of the presser member may be smaller than a dimension of the connection member.

According to the embodiment, by making the dimension of the presser member smaller, the dimension of the connection member is relatively large, and the first case part and the second case part can be reliably connected.

In the above-described embodiment, a recess may be formed on an outer circumferential surface of at least one of the first case part and the second case part, and a bottom surface of the recess may be a flat surface.

According to the embodiment, when assembling the sensor head, the worker can stably place a tool against the bottom surface of the recess to transmit a torque to the case part where the recess is formed. As a result, although the first case part and the second case part having a substantially cylindrical shape are used in the case, the above-described torque for screwing the male thread and the female thread can be added to facilitate assembly of the sensor head.

According to the disclosure, it is possible to provide a sensor head that can be miniaturized without compromising the measurement accuracy.

Exemplary embodiments of the disclosure will be described with reference to the accompanying drawings. In the drawings, parts denoted by the same reference numerals have the same or similar configurations.

Figure 1:
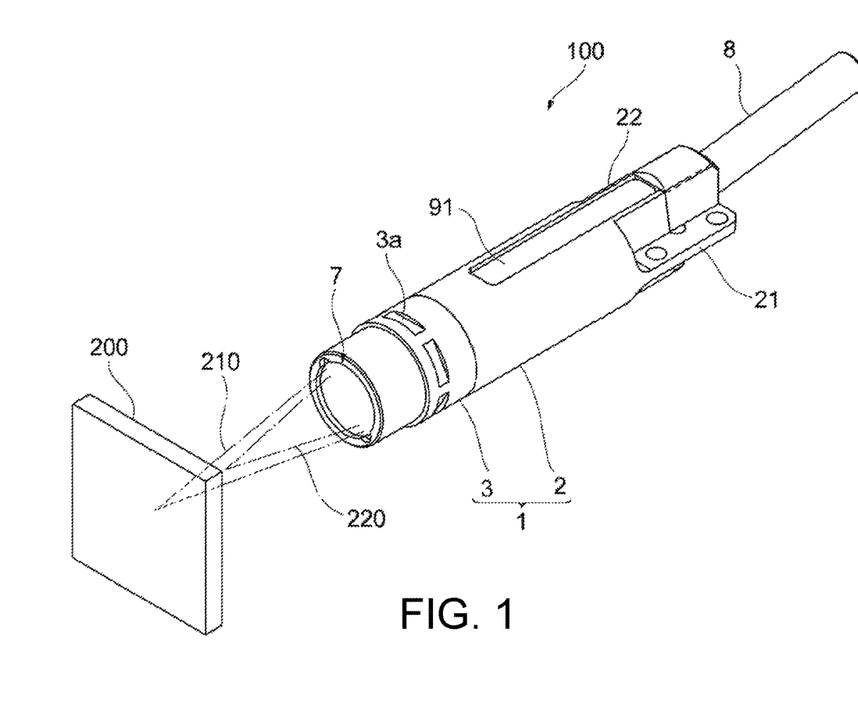
FIG. 1 is a perspective view showing the sensor head according to an embodiment.

FIG. 1 is a perspective view showing a sensor head 100 according to an embodiment. The sensor head 100 constitutes a part of a sensor for measuring the position of a measurement object 200 and includes a case 1. The case 1 has a first case part 2 and a second case part 3.

The first case part 2 has a substantially cylindrical shape, and a diffractive lens 5 (see FIG. 2, etc.), which will be described later, is arranged inside the first case part 2. A fiber case 8 is connected to an end part of the case 1. An optical fiber is arranged inside the fiber case 8 for guiding the white light emitted from a light source (not shown) to the first case part 2. The diffractive lens 5 generates chromatic aberration in a direction along the optical axis on the light emitted from the optical fiber.

The second case part 3 has a substantially cylindrical shape, and an objective lens group 7, which will be described later, is arranged inside the second case part 3. The second case part 3 fixes the objective lens group 7 so as to expose a part of the objective lens group 7.

The sensor head 100 is used by directing the objective lens group 7 toward the measurement object 200. The light with chromatic aberration generated through the diffractive lens 5 is refracted and gathered by the objective lens group 7 and emitted to the side of the measurement object 200. FIG. 1 shows light 210 of a first wavelength having a relatively long focal distance and light 220 of a second wavelength having a relatively short focal distance. The light 210 of the first wavelength is focused on the surface of the measurement object 200 while the light 220 of the second wavelength is focused before the measurement object 200.

The light reflected by the surface of the measurement object 200 is incident on the objective lens group 7. The light is gathered by the objective lens group 7, passes through the diffractive lens 5, and travels toward the side of the optical fiber. The light 210 of the first wavelength is focused on the optical fiber, and most of it is incident on the optical fiber. On the other hand, the light of other wavelengths is not focused on the optical fiber and is hardly incident on the optical fiber.

The light incident on the optical fiber is guided to a spectroscope (not shown) connected to the optical fiber. The spectroscope detects the peak of the wavelength of the light and measures the position of the measurement object 200 based on the peak.

Figure 6:
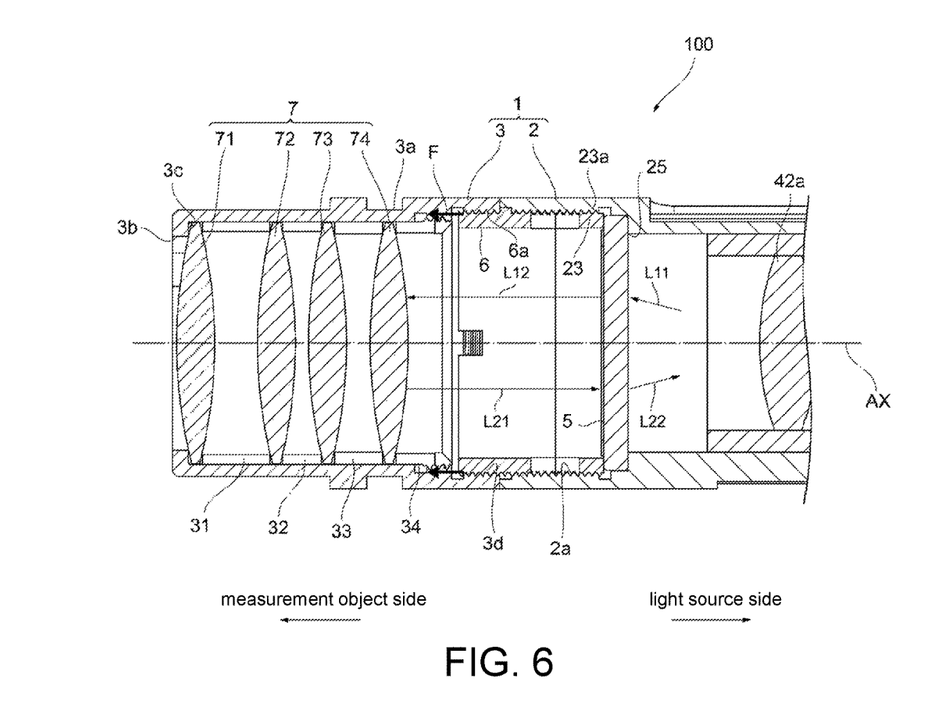
FIG. 6 is an enlarged view showing the VI part of FIG. 4.

In such a sensor head 100, a female thread part 2a is formed on the inner circumferential surface of the first case part 2 and a female thread part 3d is formed on the inner circumferential surface of the second case part 3 (see FIG. 6). The female thread parts 2a and 3d are screwed to a male thread part 6a of the connection member 6, so that the first case part 2 and the second case part 3 are connected to each other via the connection member 6. By connecting the first case part 2 and the second case part 3 having a substantially cylindrical shape in this manner, the first case part 2 and the second case part 3 can be suppressed from protruding largely outward from the objective lens group 7, etc. in the optical axis direction view. As a result, the case 1 can be miniaturized without compromising the measurement accuracy.

Configuration Example

Figure 2:
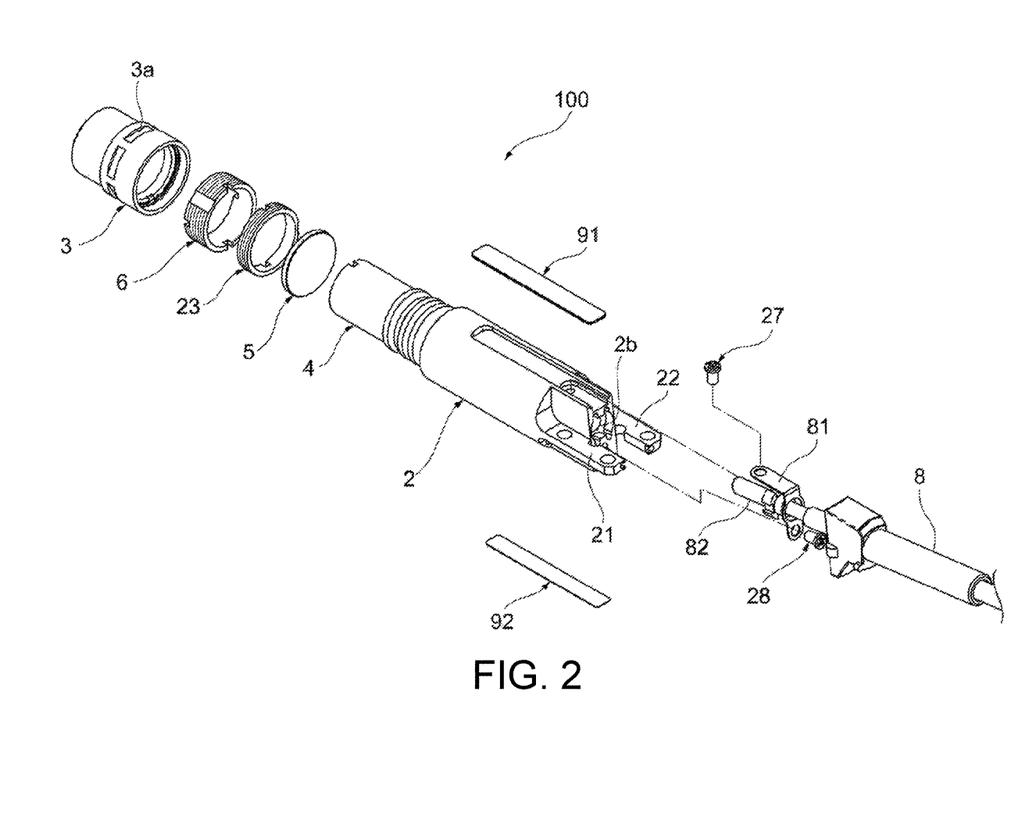
FIG. 2 is a perspective view showing the sensor head of FIG. 1.
Figure 3:
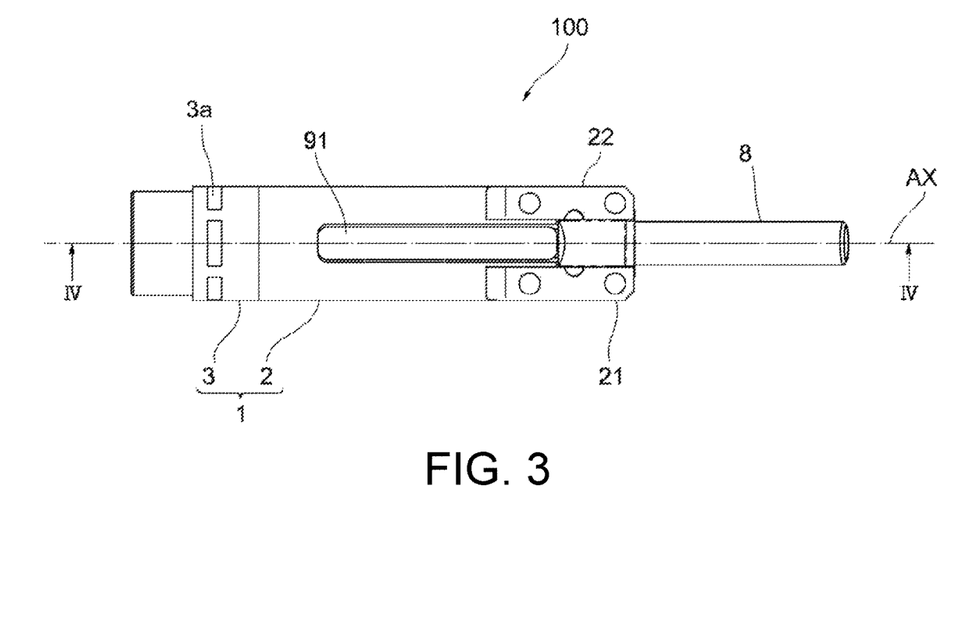
FIG. 3 is a top view showing the sensor head of FIG. 1.
Figure 4:
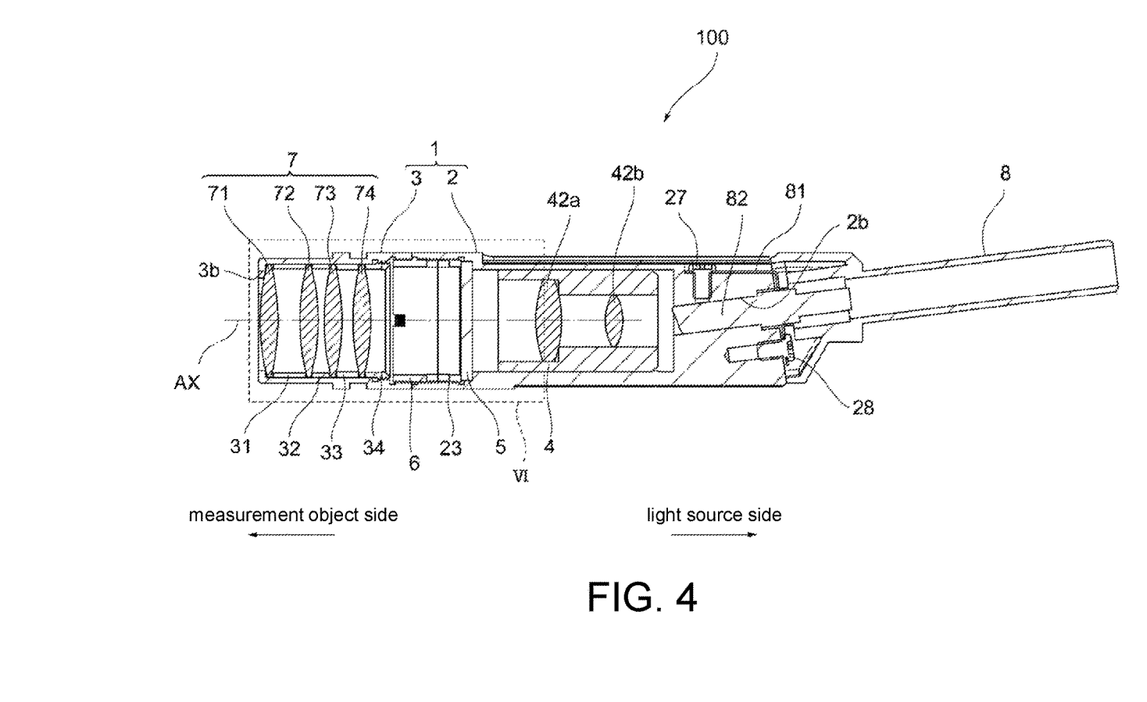
FIG. 4 is a cross-sectional view showing the IV-IV cross-section of FIG. 3.
Figure 5:
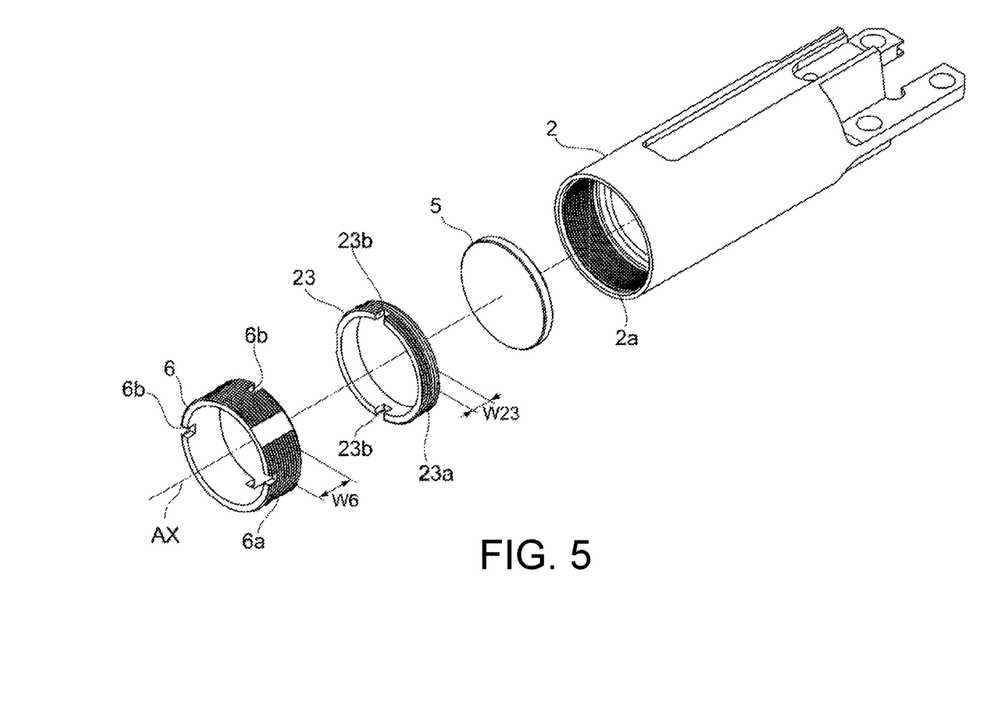
FIG. 5 is a perspective view showing a connection member and a presser member of FIG. 2.

Next, an example of the configuration of the sensor head 100 will be described with reference to FIG. 2 to FIG. 6. FIG. 2 is a perspective view showing the sensor head 100. FIG. 2 shows a part of the sensor head 100 in an exploded form. FIG. 3 is a top view showing the sensor head 100. FIG. 4 is a cross-sectional view showing the IV-IV cross-section of FIG. 3. FIG. 5 is a perspective view showing the connection member 6 and a presser member 23. FIG. 6 is an enlarged view showing the VI part of FIG. 4.

<First Case Part>

The first case part 2 has a substantially cylindrical shape with one end opened, and the first case part 2 is arranged so that the central axis thereof is substantially consistent with an axis AX. The axis AX is a virtual straight line. As shown in FIG. 5 and FIG. 6, the female thread part 2a is formed on the inner circumferential surface at one end of the first case part 2.

Further, as shown in FIG. 2 and FIG. 3, fixing parts 21 and 22 to be used for fixing the sensor head 100 are formed at the other end of the first case part 2. As shown in FIG. 2 and FIG. 4, a communication hole 2b for communicating the inside and the outside of the first case part 2 is formed between the fixing parts 21 and 22. As shown in FIG. 4, the first case part 2 houses a lens holder 4 and the diffractive lens 5 therein.

The lens holder 4 is a member having a substantially cylindrical shape. The inner diameters of the lens holder 4 differ depending on the portions. Inside the lens holder 4, a first collimating lens 42a and a second collimating lens 42b are disposed.

The first collimating lens 42a is fixed inside the lens holder 4. The second collimating lens 42b is disposed apart from the first collimating lens 42a.

The entire lens holder 4 is housed inside the first case part 2 and fixed with respect to the first case part 2. Thus, the first collimating lens 42a and the second collimating lens 42b are arranged so that the optical axes are substantially consistent with the axis AX.

The diffractive lens 5 is arranged on the side of the measurement object 200 with respect to the lens holder 4 with its optical axis substantially consistent with the axis AX. The diffractive lens 5 generates chromatic aberration in the direction along the axis AX (hereinafter, referred to as "axis AX direction") on the incident light. A lens with a focal distance inversely proportional to the wavelength of the light can be used as the diffractive lens 5.

<Second Case Part>

The second case part 3 has a substantially cylindrical shape. One end of the second case part 3 is opened, and an opening 3b is formed at the other end. As shown in FIG. 6, the female thread part 3d is formed on the inner circumferential surface at one end of the second case part 3. The opening 3b has a substantially perfect circular shape when viewed along the central axis of the second case part 3. As shown in FIG. 2, a plurality of recesses 3a are formed on the outer circumferential surface of the second case part 3. The bottom surface of the recess 3a is a flat surface. As shown in FIG. 4, the second case part 3 houses the objective lens group 7, spacers 31 to 33, and a presser member 34 inside.

The objective lens group 7 is an example of "objective lens" according to the disclosure. The objective lens group 7 includes a first objective lens 71, a second objective lens 72, a third objective lens 73, and a fourth objective lens 74. Each lens of the objective lens group 7 has a substantially circular shape, and the diameter thereof is substantially the same as the inner diameter of the second case part 3.

In addition, the "objective lens" according to the disclosure may be composed of a plurality of lenses like the objective lens group 7 or may be a single lens.

The spacers 31 to 33 have a substantially annular shape. The outer diameters of the spacers 31 to 33 are substantially the same as the outer diameter of each lens of the objective lens group 7.

The presser member 34 has a substantially annular shape, and a male thread part is formed on the outer circumferential surface of the presser member 34. The pitch of the male thread part is substantially the same as the pitch of the female thread part 3d on the inner circumferential surface of the second case part 3.

The lenses of the objective lens group 7 are spaced apart from each other and are linearly arranged so that their optical axes are substantially consistent with the axis AX. Specifically, as shown in FIG. 6, the first objective lens 71 is disposed to abut a circumference 3c of the opening 3b of the second case part 3 and be exposed from the opening 3b. The second objective lens 72 is disposed to face the first objective lens 71 with the spacer 31 interposed therebetween. The third objective lens 73 is disposed to face the second objective lens 72 with the spacer 32 interposed therebetween. The fourth objective lens 74 faces the third objective lens 73 with the spacer 33 interposed therebetween, and is interposed between the spacer 33 and the presser member 34 and fixed inside the second case part 3. The male thread part on the outer circumferential surface of the presser member 34 is screwed to the female thread part 3d on the inner circumferential surface of the second case part 3. Each lens of the objective lens group 7 is arranged so as not to generate wavefront aberration on the transmitted light.

<Fiber Case>

As shown in FIG. 2 and FIG. 4, the fiber case 8 is fixed to the first case part 2 via a leaf spring 81. The leaf spring 81 is fixed to the upper part of the first case part 2 by a screw 27 and fixed to the end part of the first case part 2 by a screw 28. The fiber case 8 houses an optical fiber (not shown) inside. A ferrule 82 is connected to the front end of the optical fiber. As shown in FIG. 4, the ferrule 82 is inserted into the communication hole 2b of the first case part 2.

As shown in FIG. 2, an upper label 91 is affixed to the upper part of the first case part 2 to cover the screw 27. A lower label 92 is affixed to the lower part of the first case part 2. A logo such as a product name may be printed on the upper label 91 and the lower label 92.

<Presser Member, Connection Member>

As shown in FIG. 2 and FIG. 5, the connection member 6 has a substantially annular shape. A male thread part 6a is formed on the outer circumferential surface of the connection member 6. The pitch of the male thread part 6a is substantially the same as the pitch of the female thread part 2a of the first case part 2 and the pitch of the female thread part 3d of the second case part 3. A plurality of notches 6b are formed in an end part of the connection member 6.

The presser member 23 is an example of "presser member" according to the disclosure. As shown in FIG. 2 and FIG. 5, the presser member 23 has a substantially annular shape. A male thread part 23a is formed on the outer circumferential surface of the presser member 23. The pitch of the male thread part 23a is substantially the same as the pitch of the male thread part 6a of the connection member 6. As shown in FIG. 5, a plurality of notches 23b are formed in an end part of the presser member 23. The outer diameter of the presser member 23 is substantially the same as the outer diameter of the connection member 6, and the inner diameter of the presser member 23 is substantially the same as the inner diameter of the connection member 6. A dimension W23 of the presser member 23 in the direction along the central axis is smaller than a dimension W6 of the connection member 6 in the same direction.

As shown in FIG. 6, the presser member 23 is arranged so as to screw the male thread part 23a thereof to the female thread part 2a of the first case part 2. By engaging a tool (not shown) with the notches 23b, the worker can transmit a torque from the tool to the presser member 23 to screw the male thread part 23a. Thus, the presser member 23 is disposed inside the first case part 2, with the central axis substantially consistent with the axis AX, on the side of the measurement object 200 with respect to the diffractive lens 5.

When the presser member 23 is disposed inside the first case part 2, the diffractive lens 5 is pressed toward the light source side by the presser member 23. The diffractive lens 5 is interposed between the presser member 23 and a step part 25 of the first case part 2 and fixed inside the first case part 2.

The connection member 6 screwed to the female thread part 2a of the first case part 2 at the male thread part 6a is exposed to the outside from one end of the first case part 2. The female thread part 3d of the second case part 3 is screwed to a portion of the male thread part 6a of the connection member 6 which is exposed to the outside from one end of the first case part 2. The worker can put a tool (not shown) against the bottom surface of the recess 3a of the second case part 3 and transmit a torque to the second case part 3 to screw the male thread part 6a to the female thread part 3d. Thus, the second case part 3 is connected to the first case part 2 via the connection member 6. The second case part 3 is connected with the central axis substantially consistent with the axis AX.

[Example of Operation]

The white light emitted by the light source is guided to the side of the sensor head 100 by the optical fiber and reaches the ferrule 82. The light enters the inside of the case 1 from the ferrule 82 while diffusing.

A part of the light that has entered the inside of the case 1 enters the inside of the lens holder 4. The light sequentially passes through the second collimating lens 42b and the first collimating lens 42a. The first collimating lens 42a and the second collimating lens 42b change the traveling direction of the light incident from the light source side and emit the light to the side of the measurement object 200. Specifically, as indicated by the arrow L11 in FIG. 6, the light emitted from the first collimating lens 42a and directed toward the diffractive lens 5 travels while diffusing.

The diffractive lens 5 generates chromatic aberration on the light incident from the side of the first collimating lens 42a and emits it along the axis AX as indicated by the arrow L12. The light is refracted and gathered by the objective lens group 7, passes through the opening 3b of the second case part 3, and is emitted toward the measurement object 200.

The light reflected by the surface of the measurement object 200 passes through the opening 3b of the second case part 3 and is incident on the objective lens group 7. The objective lens group 7 refracts the incident light and emits it to the light source side along the axis AX as indicated by the arrow L21. The diffractive lens 5 allows the light incident from the side of the measurement object 200 to pass and emits it to the light source side as indicated by the arrow L22. The first collimating lens 42a and the second collimating lens 42b gather the light incident from the side of the measurement object 200 and emit it to the light source side.

In the sensor head 100, the first case part 2 and the second case part 3 having a substantially cylindrical shape are connected in this manner, so as to be suppressed from protruding largely outward from the objective lens group 7 when viewed in the axis AX direction. As a result, the case 1 can be miniaturized without compromising the measurement accuracy.

Also, the connection member 6 is disposed between the diffractive lens 5 and the objective lens group 7. In this position, the light travels along the axis AX which is also the optical axis. Therefore, according to this configuration, it is possible to reduce the influence of variations in the dimensions of the case 1 and prevent the measurement accuracy from dropping as compared with the case where the connection member 6 is disposed at a position that the light travels to incline with respect to the axis AX.

The female thread part 2a of the first case part 2 is screwed to the male thread part 6a of the connection member 6, and the female thread part 3d of the second case part 3 is screwed to the male thread part 6a of the connection member 6. When the first case part 2 and the second case part 3 are brought into contact with each other by the screwing, as shown in FIG. 6, an external force F in the axis AX direction may act on the connection member 6. If the connection member 6 also has the function of pressing and fixing the diffractive lens 5, the fixing of the diffractive lens 5 may become unstable due to such external force F.

In contrast thereto, in the sensor head 100, the presser member 23 for pressing and fixing the diffractive lens 5 to the light source side is arranged between the connection member 6 and the diffractive lens 5 as a separate member from the connection member 6. Therefore, even if the external force F in the axis AX direction acts on the connection member 6, the external force F does not affect the presser member. As a result, the first case part 2 and the second case part 3 can be connected via the connection member 6 while the diffractive lens 5 is stably fixed.

Further, in the axis AX direction, the dimension W23 of the presser member 23 is smaller than the dimension W6 of the connection member 6. According to this embodiment, by making the dimension W23 of the presser member 23 smaller, the dimension W6 of the connection member 6 is relatively large, and the first case part 2 and the second case part 3 can be reliably connected.

Also, the recesses 3a are formed on the outer circumferential surface of the second case part 3, and the bottom surface of the recess 3a is a flat surface. According to this embodiment, when the sensor head 100 is assembled, a tool can be stably placed against the bottom surface of the recess 3a to transmit a torque to the second case part 3 where the recess 3a is formed. As a result, although the first case part 2 and the second case part 3 having a substantially cylindrical shape are used in the case 1, a torque for screwing the male thread part 6a and the female thread part 3d can be added to facilitate assembly of the sensor head 100.

In the sensor head 100, the "recess" according to the disclosure is formed only on the second case part 3. However, the disclosure is not limited to this embodiment. In other words, the "recess" according to the disclosure may be formed on at least one of the first case part 2 and the second case part 3.

The embodiment described above is intended to facilitate understanding of the disclosure and is not intended to limit the disclosure. The elements included in the embodiment and their arrangement, material, condition, shape, size, etc. are not limited to those exemplified and can be modified as appropriate. In addition, it is possible to partially replace or combine the configurations shown in different embodiments.

[Appendix]

A sensor head (100) of a sensor for measuring a position of a measurement object (200), the sensor head comprising:

a diffractive lens (5) emitting light incident from a light source side to a measurement object (200) side along an optical axis (AX) and generating chromatic aberration on the light;

an objective lens (7) disposed on the measurement object (200) side with respect to the diffractive lens (5) and gathering light incident from a diffractive lens (5) side to emit the light to the measurement object (200) side and emitting the light incident from the measurement object (200) side to the diffractive lens (5) side along the optical axis (AX); and a case (1) having a space formed inside, which houses at least the diffractive lens (5) and the objective lens (7), wherein the case (1) comprises a first case part (2) and a second case part (3) that respectively have a substantially cylindrical shape with the optical axis (AX) as a central axis and are opened at an end part, and a connection member (6) that has a substantially annular shape with the optical axis (AX) as a central axis, the diffractive lens (5) is disposed inside the first case part (2), the objective lens (7) is disposed inside the second case part (3), a male thread part (6a) is forming on an outer circumferential surface of the connection member (6), and the first case part (2) and the second case part (3) are connected to each other by screwing female thread parts (2a, 3d) respectively formed on inner circumferential surfaces of the first case part and the second case part to the male thread part (6a) of the connection member (6).

What is claimed is:

1. A sensor head of a sensor for measuring a position of a measurement object, the sensor head comprising:

a diffractive lens emitting a light incident from a light source side to a measurement object side along an optical axis and generating chromatic aberration on the light;

an objective lens disposed on the measurement object side with respect to the diffractive lens, gathering light incident from a diffractive lens side to emit the light to the measurement object side, and emitting the light incident from the measurement object side to the diffractive lens side along the optical axis; and a case having a space formed inside, which houses at least the diffractive lens and the objective lens, wherein the case comprises a first case part and a second case part that respectively have a substantially cylindrical shape with the optical axis as a central axis and are opened at an end part, and a connection member that has a substantially annular shape with the optical axis as a central axis, the diffractive lens is disposed inside the first case part, the objective lens is disposed inside the second case part, a male thread part is formed on an outer circumferential surface of the connection member, and the first case part and the second case part are connected to each other by screwing female thread parts respectively formed on inner circumferential surfaces of the first case part and the second case part to the male thread part of the connection member.

2. The sensor head according to claim 1, wherein the connection member is disposed between the diffractive lens and the objective lens.

3. The sensor head according to claim 2, wherein the case comprises a presser member that is disposed between the connection member and the diffractive lens as a separate member from the connection member, and the presser member has a substantially annular shape with the optical axis as a central axis, a male thread part is formed on an outer circumferential surface of the presser member, and the presser member presses and fixes the diffractive lens to the light source side by screwing the male thread part to the female thread part of the first case part.

4. The sensor head according to claim 3, wherein in a direction along the optical axis, a dimension of the presser member is smaller than a dimension of the connection member.

5. The sensor head according to claim 4, wherein a recess is formed on an outer circumferential surface of at least one of the first case part and the second case part, and a bottom surface of the recess is a flat surface.

6. The sensor head according to claim 3, wherein a recess is formed on an outer circumferential surface of at least one of the first case part and the second case part, and a bottom surface of the recess is a flat surface.

7. The sensor head according to claim 2, wherein a recess is formed on an outer circumferential surface of at least one of the first case part and the second case part, and a bottom surface of the recess is a flat surface.

8. The sensor head according to claim 1, wherein a recess is formed on an outer circumferential surface of at least one of the first case part and the second case part, and a bottom surface of the recess is a flat surface.

* * * * *